United States Patent [19]

Diot et al.

[11] Patent Number: 5,354,961
[45] Date of Patent: Oct. 11, 1994

[54] DEVICE AND PROCESS FOR ELECTRICAL-DISCHARGE MACHINING OF A THREE-DIMENSIONAL CAVITY WITH A THIN ROTATING TOOL ELECTRODE

[75] Inventors: Jean-Claude Diot, Douvaine; Willi Zaugg, Echenevex, both of France

[73] Assignee: Charmilles TGechnologies S.A., Switzerland

[21] Appl. No.: 17,486

[22] Filed: Feb. 12, 1993

[30] Foreign Application Priority Data

Feb. 12, 1992 [CH] Switzerland ............... 00416/92

[51] Int. Cl.$^5$ ............................................. B23H 7/20
[52] U.S. Cl. .................................. 219/69.13; 219/69.15; 219/69.2; 364/474.04; 364/578
[58] Field of Search ............... 219/69.15, 69.2, 69.13, 219/69.17; 364/578, 474.04, 474.15, 474.17, 474.18, 474.28, 474.35

[56] References Cited

U.S. PATENT DOCUMENTS

| | | | |
|---|---|---|---|
| 4,833,617 | 5/1989 | Wang | 364/578 |
| 4,879,667 | 11/1989 | Gorski et al. | 364/578 |
| 5,101,363 | 3/1992 | Rutkowski | 364/578 |

FOREIGN PATENT DOCUMENTS

| | | | |
|---|---|---|---|
| 59-73225 | 4/1984 | Japan | 219/69.13 |
| 2-252004 | 11/1990 | Japan | 364/578 |
| 3-260810 | 11/1991 | Japan | 364/578 |

Primary Examiner—Geoffrey S. Evans
Attorney, Agent, or Firm—Gifford, Groh, Sprinkle, Patmore and Anderson

[57] ABSTRACT

An EDM device for machining by electro-erosion a three-dimensional cavity by compensating for tool-electrode wear, which device includes a mechanism for rotating a tool electrode whose diameter is small in comparison to the dimensions of the cavity being eroded, a numerical control unit of known type, which controls relative three-dimensional movement between the tool electrode and the workpiece, apparatus for controlling volumetric wear rate, and computational apparatus equipped for storing the volumic shape of the cavity to be eroded in the form of virtual fine parallel layers superimposed on one another, for simulating a tool path so that the tool tip sweeps groove by groove across said successive layers, and for transmitting a corresponding signal to the three-dimensional control unit, characterized by a simulator that is programmed to calculate prior to machining the longitudinal wear of the rotating tool or a value intended for additional axial feed of the tool electrode and continuously compensating for said longitudinal wear, this calculation being made from preexisting, known technological data and parameters characterizing the geometry of the electrodes, and designed to transmit to the three-dimensional control unit a corresponding signal continuously compensating for this wear.

8 Claims, 3 Drawing Sheets

DEVICE AND PROCESS FOR ELECTRICAL-DISCHARGE MACHINING OF A THREE-DIMENSIONAL CAVITY WITH A THIN ROTATING TOOL ELECTRODE

The present invention relates to electrical-discharge machining and, more specifically, to a device for machining a three-dimensional cavity in a workpiece by electro-erosion, using a thin electrode, whose shape is simple and independent of the shape of the cavity being machined.

It relates also to an electrical-discharge machine provided with such a device.

We know that machining a three-dimensional impression or cavity in a workpiece by the EDM process generally involves an initial operation during which the electrode is gradually lowered into a piece of metal. Finishing operation, using progressively smaller current loads, are generally performed with several electrodes of progressively larger size, which gradually approach the outer dimension of the cavity, or, preferably, by moving laterally the initial electrode. The problem with this procedure is that the angles of the cavity are rounded. To obtain sharp angles, we need to use a series of progressively larger electrodes. This is a slow, expensive process, however, and it is difficult to keep the machining gap free of swarf, which render the machining operations unstable.

To overcome these drawbacks and reduce the cost and time of designing and producing electrodes, several devices and procedures have been developed for machining workpieces with a thin, rotating electrode whose shape is simple and independent of the shape of the desired cavity. For example, according to the system described in EP 281512, a rotating electrode, shaped like a solid of revolution (axisymmetric solid), improves circulation of the dielectric fluid in the machining zone and allows currents greater than 10 A/cm 2 to be used, the rotational speed of the electrode being adjusted to the fluid contamination, resulting in a kind of "EDM milling."

Some of the problems that arise from very rapid wear of this rotating electrode can be resolved by making periodic adjustments for length and for deformation of the machining tip. It has been suggested that the loss of length can be compensated for by additionally advancing the electrode along its axis, or truing the deformation tip, or replacing the electrode for a new one, as described in WO 91/00791, for example.

The subject of the present invention is a device that can be used to machine a workpiece without apparent lateral wear, under conditions that enable to simulate the longitudinal wear of the rotating electrode prior to machining, i.e., to calculate this wear from preexistent technological data and from parameters characterizing the geometry of the tool electrodes and the impression to be eroded in the workpiece. Before machining operations begin, it is thus possible to send a signal to the unit controlling the relative three-dimensional movements between workpiece and tool electrode that compensates continuously for this wear, rather than having to measure it periodically during machining operations and to adjust the programmed tool path accordingly. It also eliminates the need to experimentally determine a characteristic curve describing the change in longitudinal wear as a function of the machined distance for each type of standard tool.

To accomplish this the volume of the three-dimensional cavity to be eroded is broken down into a series of parallel sheets, or layers, whose thickness may vary between a few mm during rough machining to a few $\mu$m during a finishing operation. The machining tip of the tool electrode moves back-and-forth across the plane of these layers in a snaking movement, eroding each of them in turn until it reaches the bottom of the cavity.

The tool electrode can be in the shape of a cylinder or cylindrical tube, for example, that rotates about its axis at peripheral speeds reaching hundreds of mm/s. Its diameter can vary between 50 and approximately 0.1 mm. If a hollow tube is used, it can be flushed with fluid by injection through a central canal. A hollow tube can also be filled with a different material.

The Electrical Engineering department of the University of Yamagata conducted research using this method, which enabled them to monitor lateral deformation of the machining tip of the tool electrode as well as its loss of length. They demonstrated that the shape of the machining tip and the rate at which the length of the tool electrode decreases stabilize after a certain machining time, said length decreasing then linearly. This transition period becomes shorter as the radius of the tool electrode decreases. By using standardized electrodes for which the curve describing the change in longitudinal wear as a function of distance traveled (wear characteristic) has been established and by entering its slope (corresponding to the stable period) into the numerical control unit, it is possible, in rough machining, after an initial transition period, to automatically compensate for this loss in length ("Three-Dimensionally Controlled EDM Using Column-Shaped Electrodes," M. Tsuchiya, T. Kaneko, and S. Shohda; J. Japan Soc. Electrical-Machining (sic) Eng., 1983, 17 (34), 30–42).

During finishing operations it is necessary to periodically measure (by electric touch-sensing or an optical device) the lateral and longitudinal wear of the tool electrode, and adjust the tool path program, i.e., the program for the relative movement between workpiece and tool, as a function of these measurements, in order to compensate for lateral wear. This is a periodic compensation ("3D NC Contouring by EDM with Compensation for the Deformation of Cylindrical Tool Electrodes," Precision Engineering, Jul. 1988, vol. 10, no. 3, pp. 157–163). Under the machining conditions (low-wear finishing) used for this research, a wear pattern in which the shape of the machining tip of the tool electrode is stable and in which tool length decreases linearly cannot be produced. Machining remains in the transition period, during which the height and width of the machining tip vary continuously. It is necessary to periodically "make a reconnaissance" of it, either by direct measurement or using optical methods, in order to determine the wear volume of the electrode. In addition, it is the taper angle of the cavity that determines the shape of the tool electrode (i.e. the electrode side face is deformed along the inclination of the contour of the cavity).

The device according to the present invention, however, enables us to practically eliminate these transition phases and compensate for tool wear continuously by programming an additional tool advance along the axis before machining operations begin. This is used for both roughing and finishing operations. Programming makes use of preexistent technological data and of parameters characterising the electrodes' geometry. The applicant has shown that under certain machining conditions (in general, under conditions of high wear) the tool-electrode machining tip quickly achieves a stable shape, the duration of the transition period at the moment of entry of the tool into the workpiece being negligible. Lateral wear is such that the profile of the machining tip remains constant. It is no longer necessary, therefore, to compensate for lateral wear, and periodic correction is no longer needed, which makes the device much simpler than known devices. In addition, the depth and profile of the groove made by the invariant machining tip are also invariant, which makes it easier to program the path that the machining tip must follow in eroding the cavity, groove by groove. But most importantly, it presents the significant advantage of providing greater output, for contrary to the majority of the known forms of EDM, as wear increases, machining becomes increasingly efficient and stable, simpler and easier to simulate.

By adjusting the EDM machine to operate at a constant rate of volumetric wear, it is no longer necessary to determine wear characteristics experimentally for each type of electrode. The device described in the present invention includes a simulator programmed to calculate a value that will increment the axial advance of the tool electrode and compensate for its longitudinal wear, and transmit a corresponding signal to the numerical control unit of the EDM machine.

It also sets up the profile of the cutting tip of the tool electrode so that this remains invariant during machining operations. The taper or curvature of the cavity being eroded no longer determines the wear shape of this profile.

BRIEF DESCRIPTION OF THE DRAWINGS

The present invention will be easier to understand by referring to the attached drawings, in which.

Figure 1:
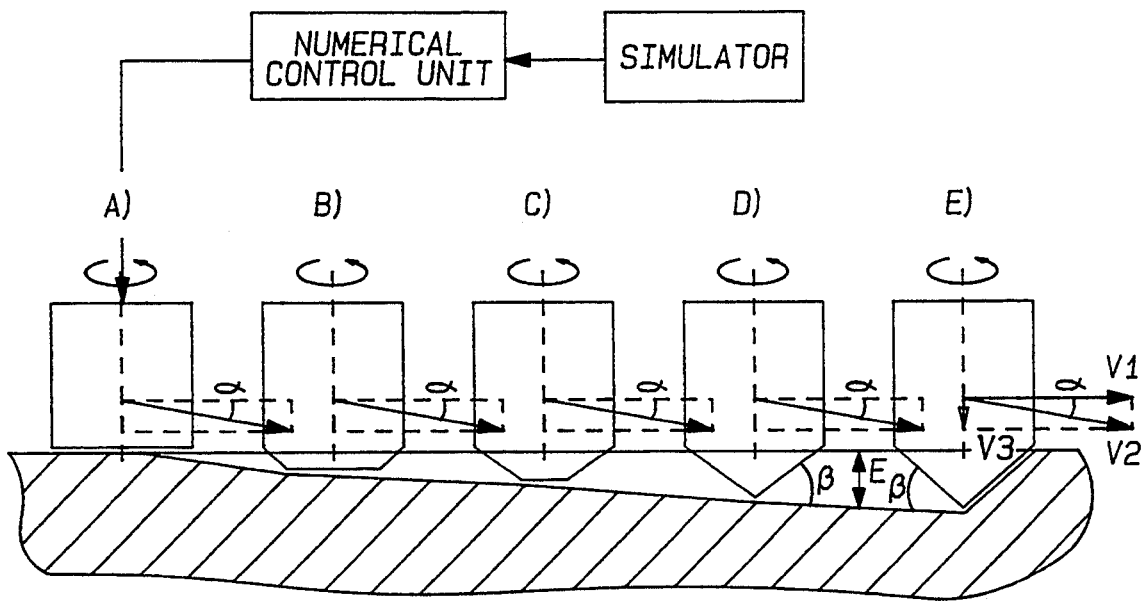
FIG. 1 illustrates the principle of the device according to the present invention.

The principle of the device described in the present invention is illustrated in FIG. 1, which shows the machining tip of a cylindrical tool electrode in five successive positions, starting with its initial contact with the workpiece (position a). The end of the transition period corresponds to position d.

We see that following a short, initial transition period, when it comes into contact with the workpiece, during which the profile of the cutting tip of the tool electrode changes, said profile remains constant (invariant) for the remainder of the machining operation (positions d to e). Electrode length alone decreases as a result of wear. In the present example, a cylindrical tool is shown, whose tip assumes a conical shape at the end of the transition phase. The angle $\beta$ made by the resulting bevel depends on the thickness E of the layer being eroded (or the depth of cut or the depth of the groove) and on the radius R of the cylindrical tool electrode.

A simulator is supplied with the value of the thickness E of the first layer of material to be eroded, the radius R of the tool electrode, and the volumetric wear rate U (a known value which can be found in technology tables). As explained below, this enables it to:

determine by a very simple calculation the angle $\alpha$ (hereinafter called "compensation angle) which the (oblique) feed direction of the tool through the workpiece has to make with the plane of the layer being eroded, in order to keep said feed direction of the cutting tip of the tool electrode parallel to the plane of the layer being eroded (and, therefore, to the surface of the workpiece), and transmit to a EDM machine's numerical control unit, which programs the X-, Y-, and Z-axis movements of the tool electrode, or, rather, of the machining head and tool holder in which the tool is held, the correct signals to perform this oblique motion.

Assuming that the lateral cut is equal to the diameter of the tool (the gap being negliged), the volume of material removed from the workpiece is $$R \times E \times v1$$

V1 being the apparent feed rate of the tool through the workpiece.

The volume of material removed from the tool is $$R \times E \times V1 \times U/100$$

The speed V3, which is the additional axial feed rate provided to compensate for the rate at which the tool volume decreases, is $$R \times E \times V1 \times U/100 \times S$$

where S is the area of the tool cross-section.

The vectors V1 and V3 are the components of the tool's programmed speed V2, and the simulator can calculate the angle $\alpha$ formed between the speed vector V2 and the plane of the layer being eroded:

$$\tan \alpha = V3/V1 = R \times E \times U/100 \times S$$

It should be noted that the value of angle $\alpha$ is independent of the tool feed rate through the workpiece. The numerical control unit of the EDM machine can operate such variations using known cutting strategies. If speed V1 varies, the additional speed V3 is automatically adjusted, since the value of angle $\alpha$ remains constant. It is not necessary to calculate the new value of V3 and alter the program.

The apparent feed rate of the tool through the workpiece (vector V1) is parallel to the plane of the layer being eroded (and, therefore, to the surface of the workpiece). In this example tool feed and the plane are both horizontal and perpendicular to the axis of the tool electrode, but other configurations are possible, where they are oblique, the axis of the tool electrode remaining vertical.

In this example the tool electrode is a cylinder with a cross-section of radius R. The formula for obtaining angle a can be simplified as follows:

$$\tan \alpha = E \times U/100 \, \pi R$$

Figure 2:
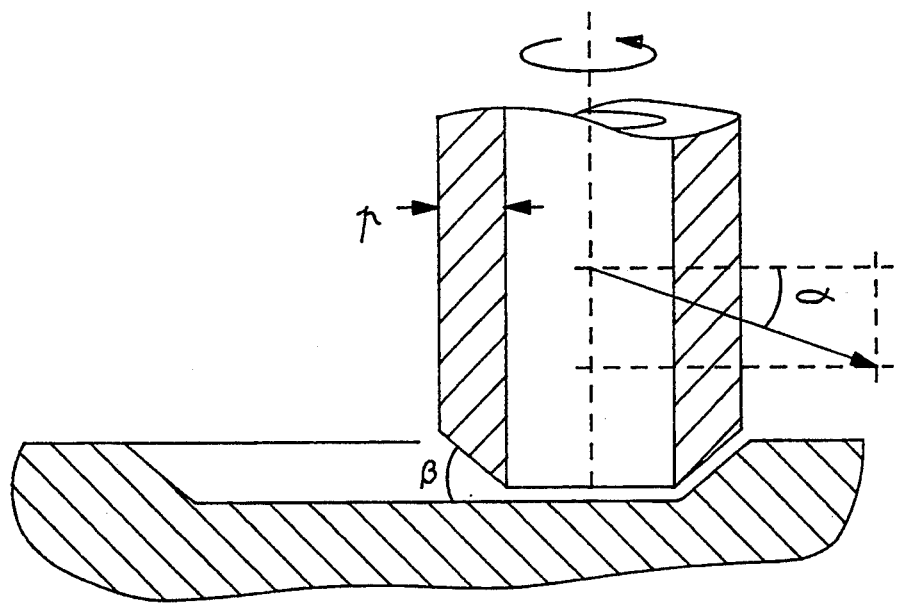
FIG. 2 represents an embodiment with a tool electrode in the shape of a hollow tube.
Figure 3A:
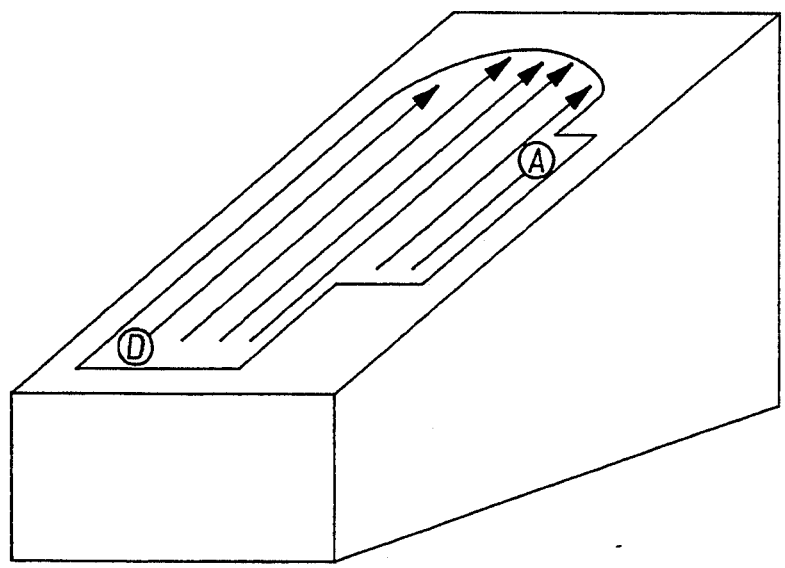
FIG. 3a-3g represent several examples of the various types of snaking movement (sweep) of the groove cut by the tool electrode as it progressively erodes a layer.
Figure 3B:
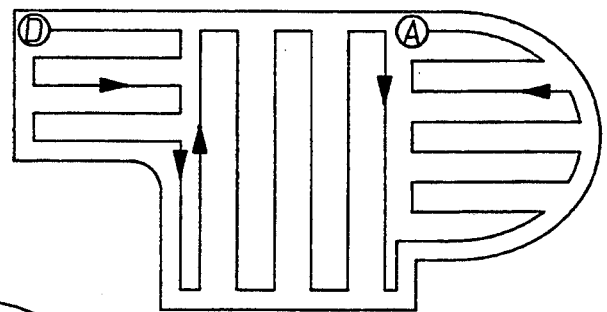
Figure 3C:
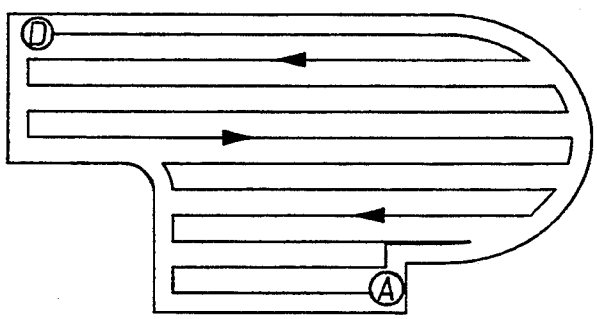
Figure 3D:
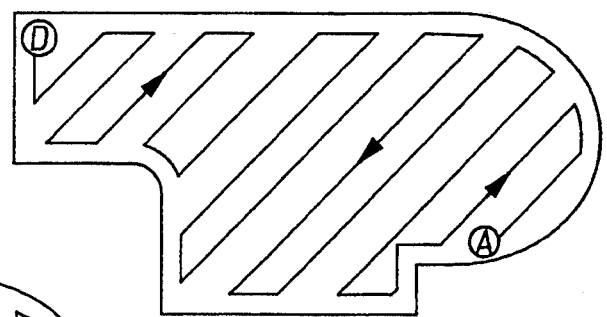
Figure 3E:
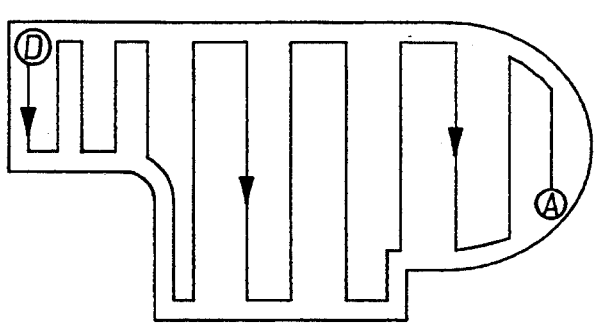
Figure 3F:
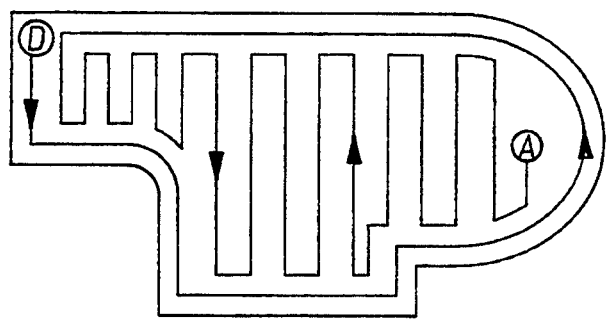
Figure 3G:
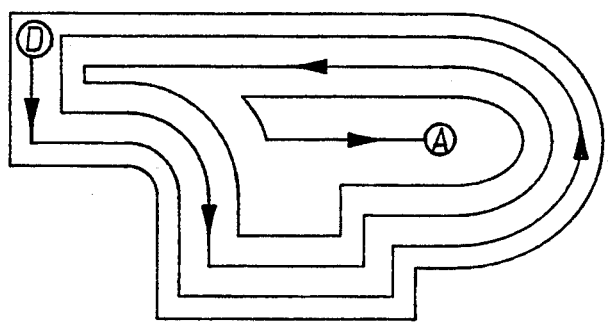

FIG. 2 represents the profile of the machining tip of a tool electrode in the shape of a hollow tube, which has become invariant at the end of the transition phase; it assumes a conic shape. The angle β of the bevel obtained depends, in particular, on the thickness E of the layer being eroded (or the depth of cut or the depth of the groove) and of the thickness p of the wall of the tube. The advantage of this type of profile is that it can be used for surfacing operations.

Other variants of the invention involve the use of differently shaped tool electrodes (square, triangular, etc.)

As indicated above, it is the simulator that, by determining angle α and supplying the machining tip of the tool electrode with an apparent motion that is perpendicular to its axis, sets up the tool electrode's invariant profile.

FIGS. 3a–3g represent several examples of the kinds of movement that the machining tip of the tool electrode can make in eroding a layer of material. This movement can be altered from one layer to the next.

Width of cut (lateral material removal) varies generally as the tool travels.

As a first example, a given sweep mode will usually leave a burr along the edges of the layer of material that has been eroded and the tool must be programmed to make a transverse cut across these burrs in order to remove any remaining material along the edges.

Figure 4:
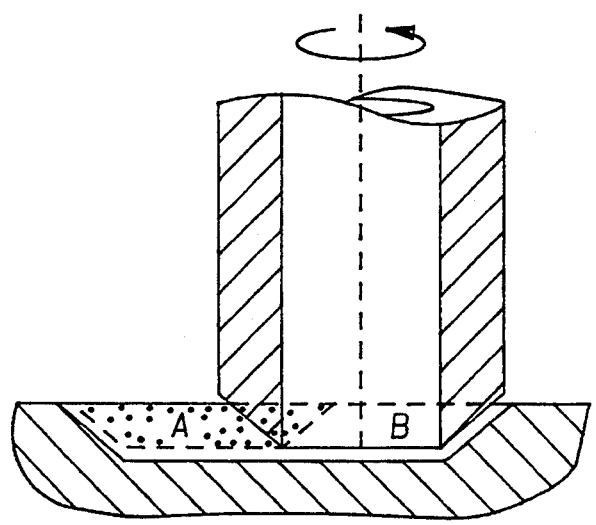
FIG. 4 illustrates the erosion of two neighboring grooves by a hollow-tube tool electrode.

As another example, whenever the tip of the tool electrode sweeps across a layer of material in parallel to a previously eroded groove, its path is programmed so that the bottom of the new groove is adjacent to that of the previously eroded groove. This is done in order that the bottom of the layer remains plane. If, for example, a hollow tube is used as the tool electrode, the cutting tip assumes the shape of a truncated cone. In cutting a flat bottom, for cutting the initial groove, the lateral cut will have a trapezoidal shape (see trapezoid A, the stippled area in FIG. 4), whereas for eroding subsequent grooves, said lateral cut will assume a rhomboid shape (see B in FIG. 4).

In both examples above of variations of the lateral cut, one of the other functions of the simulator according to the present invention, is to follow (evaluate) this variation as a function of tool path position and to calculates a new value (for angle α, for example) in order to continuously adapt the wear compensation to any variations in lateral material removal.

Figure 5:
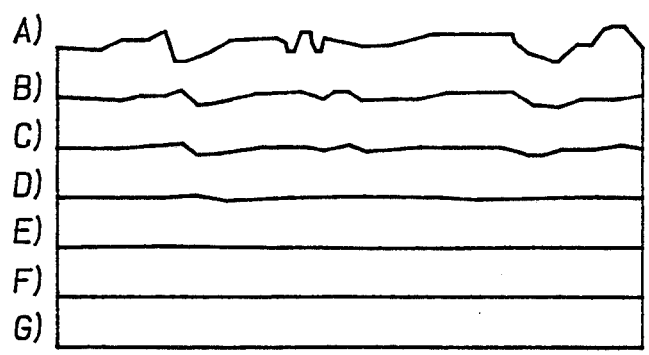
FIG. 5 represents the gradual reduction of surface defects—which may result, for example, from improper truing of the initial surface—after several layers have been eroded.

FIG. 5 illustrates two significant advantages of the device described by the present invention:

the damping of surface defects (which may result from improper truing of the initial surface) after several layers of material have been eroded;

the fact that without any action by the simulator according to the present invention, the tool path of the cutting tip has a tendency to remain parallel to the surface being machined, even if it is not perfectly plane.

The irregular line a represents a cut over a poorly ground surface. Lines b to g represent cuts made by subsequent passes of the tool across successive layers of material.

We see from the illustration that the tool' tip travels upward toward the surface of the workpiece whenever there is excess material to be removed without it being necessary to change the program. As the actual thickness of material increases, the tool electrode wears at a faster rate, but the simulator does not increase angle α. Because the tool wear becomes not enough compensated, the electrode rises. The reverse situation occurs when there is less material to be removed. Here tool wear is overcompensated and the cutting tip sinks deeper into the material: depth of cut is self regulating. Because the rise and fall of the cutting tip occurs after a (short) transition period, this delay gradually "erases" surface irregularities at each successive pass.

One of the other functions of the simulator according to the present invention is to compare the actual reduction in the length of the tool electrode with its theoretical value and adjust consequently the value of angle α. Measurement of the actual length of the tool electrode can be done periodically (for example, before eroding a new layer ) through the use of available technology (electric touch-sensing, optical devices, etc.) that are connected to the simulator.

Volumetric wear rate of the tool electrode is affected by a number of factors, such as temperature variations and the extent of contamination of the dielectric fluid by machining swarf. It is, therefore, preferable to make at least two or three verifying measurements at the beginning of machining in order to correct ,if needed, angle α, before to go further on with machining, and to adjust tool wear compensation for any variation in volumetric wear rate.

We claim:

1. An EDM device for machining by electro-erosion a three-dimensional cavity of a workpiece by compensating for tool-electrode wear, said device comprises:

a mechanism rotating a tool electrode whose diameter is small in comparison to dimensions of a cavity of a workpiece being eroded, a numerical control unit which controls relative three-dimensional movement between the tool electrode and the workpiece, means for controlling volumetric wear rate of the electrode, and computational means for storing the volumetric shape of the cavity to be eroded as virtual fine parallel layers superimposed on one another, for simulating a tool path so that a tip of the tool sweeps groove by groove across said superimposed layers, and for transmitting a signal representative of the tool path to the control unit, said device further comprising a simulator that calculates, prior to machining, longitudinal wear of the rotating tool or a value intended for additional axial feed of the tool electrode and continuously compensates for said longitudinal wear, said calculation being made from data stored in said simulator and parameters characterizing the geometry of the electrode, said simulator transmits to the control unit a corresponding signal continuously compensating for said longitudinal wear.

2. The device according to claim 1 in which the value calculated by the simulator is a tangent of the angle α that must be made by the oblique feed direction of the tool through the workpiece with the plane of the layer being eroded in order that the cutting tip of the tool electrode remains parallel to the plane of the layer and, therefore, to the surface of the workpiece.

3. The device according to claim 1 in which the value calculated by the simulator is independent of the value of the feed rate of the tool relative to the workpiece.

4. The device according to claim 1, in which the simulator calculates the longitudinal wear of the tool electrode or the value used to control its additional axial feed that compensates for said wear, in such a way that the apparent feed of the tool through relative to the workpiece and the plane of the layer being eroded are both horizontal and perpendicular to the axis of the tool electrode.

5. The device according to claim 1, in which at Least one of the data or of the parameters characterizing the geometry of the electrode and used to program the simulator, comprises the volumetric wear rate, the thickness of the layer of material to be eroded, the radius of the tool electrode, and a wall thickness of the tool electrode.

6. The device according to claim 1, in which the simulator further evaluates the variation in lateral material removal as a function of the location on the tool path and calculates, based on said variation, a value representative of the longitudinal wear of the tool electrode or of the value used to control its additional axial feed, so as to continuously adjust wear compensation for any variation in said lateral material removal.

7. The device according to claim 1 in which the simulator works in conjunction with means for periodically measuring the actual decrease in the length of the tool electrode, the simulator is programmed to compare the decrease to a theoretical value and to adjust the value for longitudinal wear of the tool electrode, or the value used to control its additional axial feed, in such a way as to adjust the compensation for tool wear, specifically to variations of the volumetric wear rate.

8. The device according to claim 1, wherein the tool electrode is a cylinder, or a hollow tube, or a cylinder cladded with a second metal.

* * * * *